(12) United States Patent
Kim

(10) Patent No.: US 9,414,021 B2
(45) Date of Patent: Aug. 9, 2016

(54) BROADCAST PROGRAM INFORMATION SEARCH SYSTEM AND METHOD

(71) Applicant: SAMSUNG ELECTRONICS CO., LTD., Suwon-si (KR)

(72) Inventor: Kyung-ah Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/446,753

(22) Filed: Jul. 30, 2014

(65) Prior Publication Data

US 2014/0344866 A1 Nov. 20, 2014

Related U.S. Application Data

(63) Continuation of application No. 10/733,579, filed on Dec. 12, 2003, now abandoned.

(30) Foreign Application Priority Data

Dec. 13, 2002 (KR) .................. 10-2002-0079619

(51) Int. Cl.
*H04N 5/445* (2011.01)
*H04N 7/16* (2011.01)
(Continued)

(52) U.S. Cl.
CPC ........... *H04N 7/165* (2013.01); *H04N 5/44543* (2013.01); *H04N 21/232* (2013.01); *H04N 21/42212* (2013.01); *H04N 21/482* (2013.01);
(Continued)

(58) Field of Classification Search
CPC ............ H04N 21/4828; H04N 21/232; H04N 21/42212
USPC ................................... 725/53, 151
See application file for complete search history.

(56) References Cited

U.S. PATENT DOCUMENTS 6,463,428 B1 * 10/2002 Lee et al. .................. 707/750
7,209,942 B1    4/2007 Hori et al.
(Continued)

FOREIGN PATENT DOCUMENTS

GB    2325537 A    11/1998
WO    00/11869 A1    3/2000
(Continued)

OTHER PUBLICATIONS

European Search Report issued on Oct. 27, 2011 in the corresponding European Patent Application No. 03104266.6.

*Primary Examiner* — Pankaj Kumar
*Assistant Examiner* — Franklin Andramuno
(74) *Attorney, Agent, or Firm* — Sughrue Mion, PLLC

(57) ABSTRACT

A content program information search system and method is described. The system comprises a digital signal receiver for detecting and displaying a content signal and/or detailed content information for one or more search terms from a digital signal transmitted from a transmitter; and a server having a database for storing search terms inputted from external devices, the inputted search terms being stored by order of priority based for example on search frequency, such that the server extracts and transmits to the transmitter search terms from the first database, and the digital signal receiver displays according to the order of priority at least one search term transmitted from the transmitter. The viewer thus has search terms of high search frequency to enable the viewer to rapidly and easily search for information on a desired content program.

9 Claims, 8 Drawing Sheets

(51) Int. Cl.
   *H04N 21/422*   (2011.01)
   *H04N 21/232*   (2011.01)
   *H04N 21/482*   (2011.01)
   *H04N 21/84*    (2011.01)

(52) U.S. Cl.
   CPC .......... *H04N 21/4828* (2013.01); *H04N 21/84* (2013.01)

(56) References Cited

U.S. PATENT DOCUMENTS

| | | |
|---|---|---|
| 7,213,256 B1 | 5/2007 | Kikinis |
| 7,454,777 B1 * | 11/2008 | Nishikawa et al. ........... 725/151 |
| 2001/0037377 A1 * | 11/2001 | Nakano et al. ................. 709/219 |
| 2002/0087985 A1 * | 7/2002 | Kamen et al. ................... 725/39 |
| 2002/0170062 A1 | 11/2002 | Chen et al. |
| 2003/0004941 A1 * | 1/2003 | Yamada et al. .................... 707/3 |
| 2003/0033174 A1 * | 2/2003 | Ikeda et al. ....................... 705/5 |
| 2003/0093260 A1 | 5/2003 | Dagtas et al. |
| 2003/0140309 A1 | 7/2003 | Saito et al. |
| 2005/0278741 A1 * | 12/2005 | Robarts et al. .................. 725/46 |

FOREIGN PATENT DOCUMENTS

| | | |
|---|---|---|
| WO | 01/73596 A2 | 10/2001 |
| WO | 01/75546 A2 | 10/2001 |

* cited by examiner

FIG. 4A

PROGRAM SEARCH

| BY BEST KEYWORD | BY TEXT INPUT | BY CATEGORY | BY GIVEN KEYWORD |

| No. |  | No. |  |
|---|---|---|---|
| 1 | LORD OF THE RINGS | 6 | PRESIDENT ELECTION |
| 2 | WORLDCUP | 7 | SNOWBOARD |
| 3 | PUSAN | 8 | HARRY POTTER |
| 4 | SKI | 9 | EPISODE 1 |
| 5 | CONCERT | 10 | STOCK |

1/3

FULL EPG | EXIT

FIG. 4B

PROGRAM SEARCH

| BY BEST KEYWORD | BY TEXT INPUT | BY CATEGORY | BY GIVEN KEYWORD |

| EXIT TO BRUCLIN | EPISODE 1 | FRIENDS |
| FINAL ANALYSIS | FRANKLIN | GOOD FELLAS |
| GEORGE LUCAS | HEAVEN | HARRISON FORD |
| HONOR OF SOLDIERS | INNSBRUCK | INDIANA JONES |
| INGRID BERGMANN | JAY RENO SHOW | JUNGLE JIM |

2/6

FULL EPG | EXIT

BROADCAST PROGRAM INFORMATION SEARCH SYSTEM AND METHOD

CROSS-REFERENCE TO RELATED APPLICATION

This is a continuation application of U.S. patent application Ser. No. 10/733,579, filed on Dec. 12, 2003 which claims the priority from Korean Application No. 2002-79619, filed Dec. 13, 2002, all of which applications are incorporated herein by references.

BACKGROUND OF THE INVENTION

1. Field of the Invention

The present invention relates to a broadcast program information search system and a method thereof, and more particularly, to a broadcast program information search system and a method displaying search terms (or keywords) of high search frequency out of detailed information on receiving broadcast programs so that a user can easily search for broadcast programs he or she wants.

2. Description of the Related Art

A digital broadcast system generally provides multiple channels, that is, lots of broadcast programs compared to an analog broadcast system. The electronic program guide (EPG) is a service that has been proposed to allow a user to select easily broadcast programs that the user wishes from such multiple channels.

The EPG service is a service providing detailed information on broadcast programs through unoccupied frequency bands or channels transmitting certain broadcast signals. The EPG service provides EPG information such as a broadcast program schedule on the screen of a digital TV receiver, and, if a broadcast program title is chosen, enables a user to have diverse detailed information such as a channel number for a broadcast program, broadcast times, a synopsis, and so on.

Such EPG information is stored in a digital TV receiver, and the digital TV receiver provides a convenient function enabling a user to search for detailed information on broadcast programs by using the stored EPG information. The currently proposed modes include a search mode by text input and a search mode by category selection.

FIGS. 1A to 1C are exemplary views shown to explain a conventional method for searching for information on broadcast programs.

The search mode by text input is a mode that displays a keyboard view as shown in FIG. 1A on a display device such as a digital TV receiver by using a remote controller or a wireless keyboard capable of communicating with the digital TV receiver, allows search terms to be typed in, has a search key control, searches for information on a broadcast program corresponding to the typed-in search terms out of stored EPG information, and displays a search result window as shown in FIG. 1C.

In addition, the search mode by category selection is a mode that classifies and displays broadcast programs on a display device by category as shown in FIG. 1B, has a certain category (for example, sports) and any one of its submenu (for example, soccer, golf, baseball, and so on) chosen in order, and allows searching for a broadcast program corresponding to the selected submenu item, and displays a search result window as shown in FIG. 1C.

However, the conventional search method as shown in FIG. 1A requires much time for a user who is not familiar with the use of keyboard or when a user types in search terms by using a remote controller. Further, it has a problem in that a user types in certain search terms and repeats a search process for the typed-in search terms when the user does not know or does not decide search terms for a broadcast program he or she wants to watch.

Further, the conventional search method as shown in FIG. 1B has a problem in that, if a user does not know or does not decide in advance a category for a broadcast program he or she wishes to watch, it has the user select a certain category and repeat a process for searching the submenu of the selected category until a desired broadcast program is searched for.

SUMMARY OF THE INVENTION

Accordingly, it is an aspect of the present invention to provide a broadcast program information search system and method providing a viewer with search terms of high search frequency to enable the viewer to rapidly and easily search for information on a broadcast program he or she wishes.

In order to achieve the foregoing and other aims of the invention, a broadcast or other content program information search system according to the present invention comprises a server logically connected to a first database configured to store a plurality of search terms inputted from external devices; and a digital signal receiver configured to detect and to display for a selected search term of the plurality of search terms at least one of a content signal and detailed content information from a digital signal transmitted from a transmitter, wherein said server is configured to extract from the first database based on an order of priority based on search frequency and to transmit to the transmitter at least one transmission search term of the plurality of search terms, and said digital signal receiver is configured to display in the order of priority the at least one transmission search term transmitted from the transmitter.

More particularly, the content program information search system may further comprise an internet service provider configured to provide a path to transmit the selected search term of the plurality of search terms from an external device of the external devices to the first database, the external device being at least one digital signal receiver connected to said internet service provider.

Further, in the content program information search system the digital signal receiver may include: a detector configured to detect the at least one transmission search term of the plurality of search terms from the digital signal; a list generator configured to generate a search term list by arrangement of the detected transmission search term based on the order of priority; a controller configured to control display of the generated search term list if a user request for a search is inputted, and, if the selected search term is selected from the displayed search term list, to control the display of the detailed content information for the selected search term; a graphic engine configured to provide in a displayable form the search term list and the detailed content information for the selected search term according to control of said controller; a display unit configured to display at least one of the search term list and the detailed content information provided by said graphic engine; and a communication interface configured to transmit the selected search term to the first database.

Also, the content program information search system further comprises a second database configured to store content program guide information including the detailed content information, the server configured to transmit to the transmitter the broadcast program guide information and the at least one transmission search term of the plurality of search terms according to the order of priority.

Further, the content program information search system is configured to detect the content program guide information from the digital signal, and said digital signal receiver further includes: a proper noun extractor configured to extract at least one proper noun from the detected content program guide information; and a proper noun storage configured to store the extracted proper noun, and, if the user request for the search in at least one of a noun search mode based on a proper noun, a text search mode based on text input, and a category search mode based on a category is received, the controller controls searching for a desired content program from the content program guide information according to the search mode requested.

Further, in the content program information search system said digital signal receiver may further include: an information storage configured to store the detected content program guide information; and a search term storage configured to store the at least one transmission search term according to the order of priority.

Further, the content program information search system further may comprise an internet service provider providing a path for transmitting the selected search terms of the plurality of search terms transmitted from the external devices to the first database, wherein at least one external device of the external devices is a terminal configured to input and to output data and is configured to be connected to said internet service provider.

Also provided is a content program information search system comprising a server logically connected with a database configured to store a plurality of search terms transmitted from a digital signal receiver, said server configured to extract at least one transmission search term of the plurality of search terms according to an order of priority based on search frequency from the database and to transmit the at least one transmission search term; the at least one digital signal receiver configured to detect and to display from a digital signal transmitted from the transmitter detailed content information for a selected search term of the plurality of search terms, and to transmit the at least one selected search term to an internet service provider; and the internet service provider configured to transmit to the database the selected search term transmitted from the at least one digital signal receiver, and to provide a path for transmitting to the at least one digital signal receiver the at least one transmission search term, wherein the at least one digital signal receiver is configured to display in a set arrangement pattern the at least one transmission search term in the order of priority transmitted from the server.

Further, in the content program information search system the digital signal receiver may include: a communication interface configured to receive the at least one transmission transmitted from the server, and to transmit the selected search term to the database; a list generator configured to generate a search term list by arranging the at least one transmission search term received by said communication interface in the arrangement pattern based on the order of priority; a controller configured to control the generated search term list to be displayed, if a user request for a search for content programs is received, and, if the selected search term is selected from the displayed search term list, to control display of the detailed content information for the selected search term; a graphic engine configured to provide the search term list and the detailed content information for the selected search term in a displayable form according to control of the controller; and a display unit configured to display at least one of the search term list and the detailed content information provided by the graphic engine.

Further, in the content program information search system the digital signal receiver may be an internet-accessible web television receiver.

An information search method is also disclosed for a system including a digital signal receiver connected through an internet network to a server for providing content program guide information, said method comprising: detecting for a selected search term detailed content information from a digital signal transmitted from a transmitter to the digital signal receiver, and transmitting the selected search term to the server through the internet network; storing the selected search term in a database logically connected to the server; and extracting at least one transmission search term according to an order of priority based on search frequency from the database and transmitting to the transmitter the at least one transmission search term and the content program guide information, the selected search term being a search term one of inputted and selected through a search mode view set in the digital signal receiver to search for the content program guide information.

In the information search method the detecting the detailed content information for the selected search term may include: detecting the at least one transmission search term from the digital signal; generating a search term list by arranging the detected transmission search term in an arrangement pattern based on the order of priority; displaying, if a search for a content program is requested, the generated search term list based on the search frequency and providing a search mode; displaying, if the selected search term is selected from the displayed search term list, the detailed content information for the selected search term; and transmitting the selected search term to the server via the internet network.

The information search method as claimed may further comprise: at least one terminal communicatably connected to the internet network and capable of inputting and outputting data, the selected search term searched from the terminal being transmitted to and stored in the server.

Further, in the information search method, the search mode may be at least one of a search mode based on search frequency, a search mode based on a proper noun extracted from the content program guide information, a search mode based on an input text, and a search mode based on a program content category.

Also disclosed is a content program information search system comprising: a first database configured to store a plurality of search terms, a search term of the plurality of search terms being forwarded to said first database after a search is performed based on the forwarded search term; and a server configured to extract based on an order of priority a transmission search term of the plurality of search terms from said first database, and to transmit the transmission search term via at least one of a wireless transmitter and a network transmission device to a digital signal receiver, wherein the search is for at least one of a content program signal and a detailed content information detected by the digital signal receiver.

Further, in this system the order of priority may be based on a search frequency for the forwarded search term.

Further, in this system the search includes a list mode in which a list of transmission search terms is displayed by the digital signal receiver according to the order of priority, and a selection mode, in which the forwarded search term of the list of search terms is selected.

Further, this system may further comprise a second database logically connected to said server and configured to store the detailed content information, wherein said server extracts the detailed content information from said second data base and transmits the detailed content information to the digital signal receiver.

Also disclosed is a content program information receiving search system comprising: a controller configured to generate a list of search terms according to an order of priority based on at least one transmission search term received, to provide a selected search term from the list of search terms to a digital signal receiver, and to forward to a server the selected search term; and said digital signal receiver configured to detect and to display for the selected search term at least one of a content signal and detailed content information from a digital signal transmitted from a transmitter, the at least one transmission search term being one of received in the digital signal and received from the server via a digital network.

Further, in this system the order of priority may be based on a search frequency of the selected search term.

Further, in this system the controller may transmits the selected search term to the server via the digital network.

BRIEF DESCRIPTION OF THE DRAWINGS

The invention will be described in detail with reference to the following drawings in which like reference numerals refer to like elements, and wherein:

FIG. 4A and FIG. 4B are views for showing search mode views according to FIG. 2;

DETAILED DESCRIPTION OF THE PREFERRED EMBODIMENTS

Hereinafter, the present invention will be described in detail with reference to the accompanying drawings.

Figure 2:
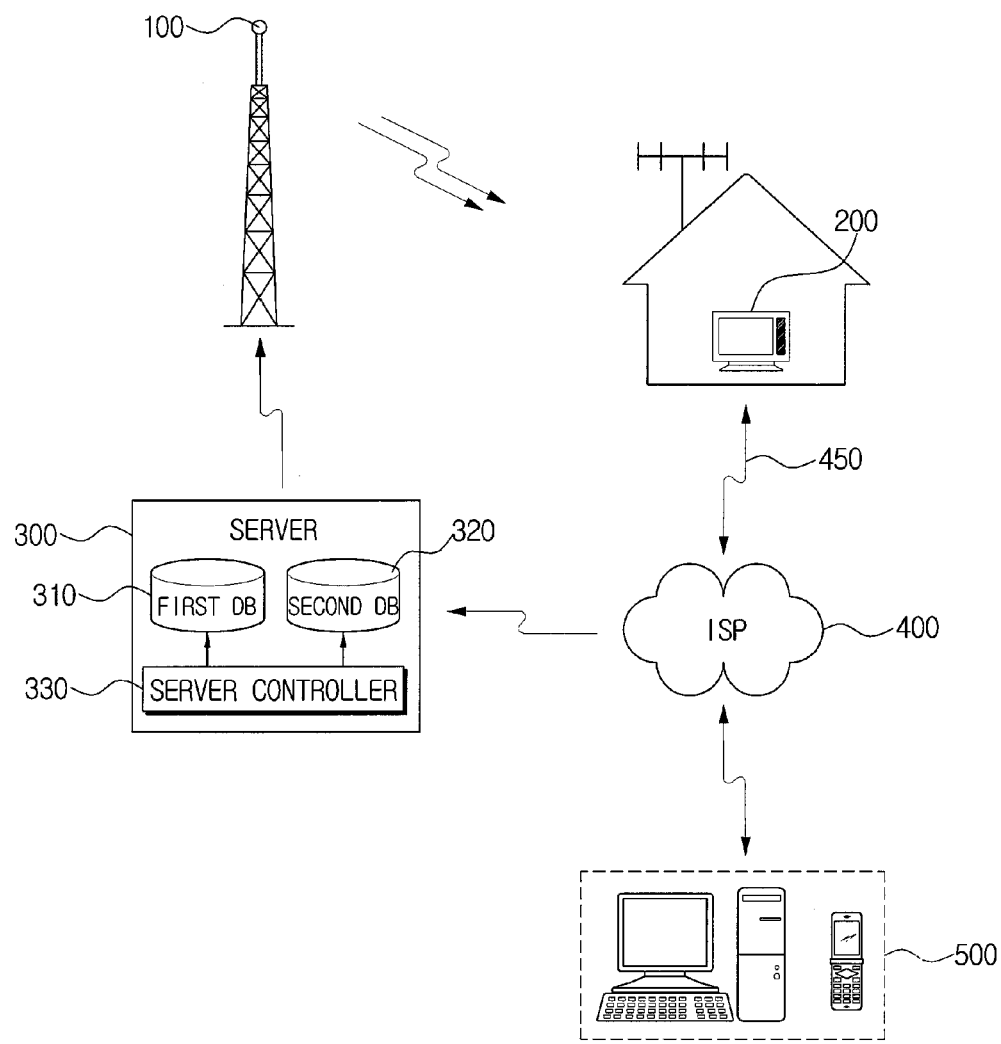
FIG. 2 is a view for schematically showing a broadcast program information search system according to a first preferred embodiment of the present invention.

FIG. 2 is a view for schematically showing a broadcast program information search system according to the first preferred embodiment of the present invention.

In FIG. 2, a digital signal receiver 200 is connected to a server 300 by an internet service provider 400, and receives a digital signal from a transmitter 100.

The transmitter 100 transmits a digital signal through ground wave broadcasts, cable broadcasts, satellite broadcasts, and so on. A digital signal includes a digital broadcast signal and broadcast program guide information on the digital broadcast signal.

In case a digital broadcast signal is a ground wave broadcast signal, the broadcast program guide information may be transmitted in the same frequency as the digital broadcast signal. In case the digital broadcast signal is a cable broadcast signal or a satellite broadcast signal, the broadcast program guide information may be transmitted in a different frequency from the digital broadcast signal. Other types of broadcast systems, such as webcasting, content delivery to multiple users over a network, and other systems for which the present invention is suitable are also contemplated and are well within the spirit of the present invention.

Further, if the digital signal receiver 200 is a ground wave signal receiver, the broadcast program guide information corresponds to EPG information. Hereinafter, an illustrative example of the present invention will be described using a digital broadcast signal of the ground wave broadcast.

The digital signal receiver 200 processes a signal such as infrared received from an external input device (not shown), which is a set-top box or a digital television receiver displaying on a display unit (not shown) a digital broadcast signal for a channel tuned through a tuner (not shown) from plural digital signals transmitted from the transmitter 100 and/or broadcast program guide information related to the tuned channel.

The broadcast program guide information consists of detailed broadcast information for digital broadcast signals, that is, for individual broadcast programs, such as EPG information for example. Further, the external input device (not shown) may be a remote controller transmitting wireless signals such as infrared signals as well as other input devices such as wire and/or wireless keyboards.

A server 300 has a first database (hereinafter, referred to as "DB") 310, a second DB 320, and a server controller 330.

The first DB 310 stores search terms that are externally typed in, and, at that time, the search terms are stored by order of priority based on search frequency. A search term is inputted and/or selected through a certain EPG search view provided on an external device in order that a user can conveniently use EPG services.

Further, the external devices for typing in or selecting search terms may be plural digital signal receiver 200, terminals such as computers capable of inputting and outputting data, cellular phones, PCS, and so on, for example. Descriptions of a search term input method from such external devices and transmissions to the first DB 310 will be made in detail with reference to FIG. 3 which will be explained below.

The second DB 320 stores broadcast program guide information, that is, EPG information, inclusive of diverse and detailed broadcast information. The EPG information is stored by channel, but, preferably, detailed information on plural broadcast programs organized for each channel is stored.

The server controller 330 controls storing in the first DB 310 by order of priority search terms inputted from an external device according to search frequency, and controls overall operations of the server 300. That is, the server controller 330 stores in the first DB 310 in the form of a look-up table search terms inputted from plural external devices and search frequencies of the search terms, and, preferably, stores them with reference to the search frequency. That is, it is preferable to store search terms in order from the highest to the lowest in search frequency.

Further, the server controller 330 extracts at least one of the search terms according to the order of priority out of plural search terms stored in the first DB 310 and transmits the search terms to the transmitter 100 by a certain period. The search term transmitted is the one with the highest order of priority if only one search term is transmitted, and if more than one is transmitted, then the search term with the next highest order of priority is transmitted until the search term with a pre-determined order of priority is reached. According to this, the transmitter 100 transmits to the digital signal receiver 200 at least one search term according to the order of priority, including a broadcast signal and EPG information.

The internet service provider (hereinafter, referred to as "ISP") 400 provides a path for sending to the first DB 310 search terms transmitted from an external device.

In order to do so, the plural external devices and the server 300 are provided with a communication interface (not shown) which enables communications through Local Area Network (LAN) lines 450 or in the wireless manner.

A data transmission method through the ISP 400 is a transmission method using the internet network or base stations, which can be easily understood by those skilled in the art so that additional descriptions of the method will be omitted.

Figure 3:
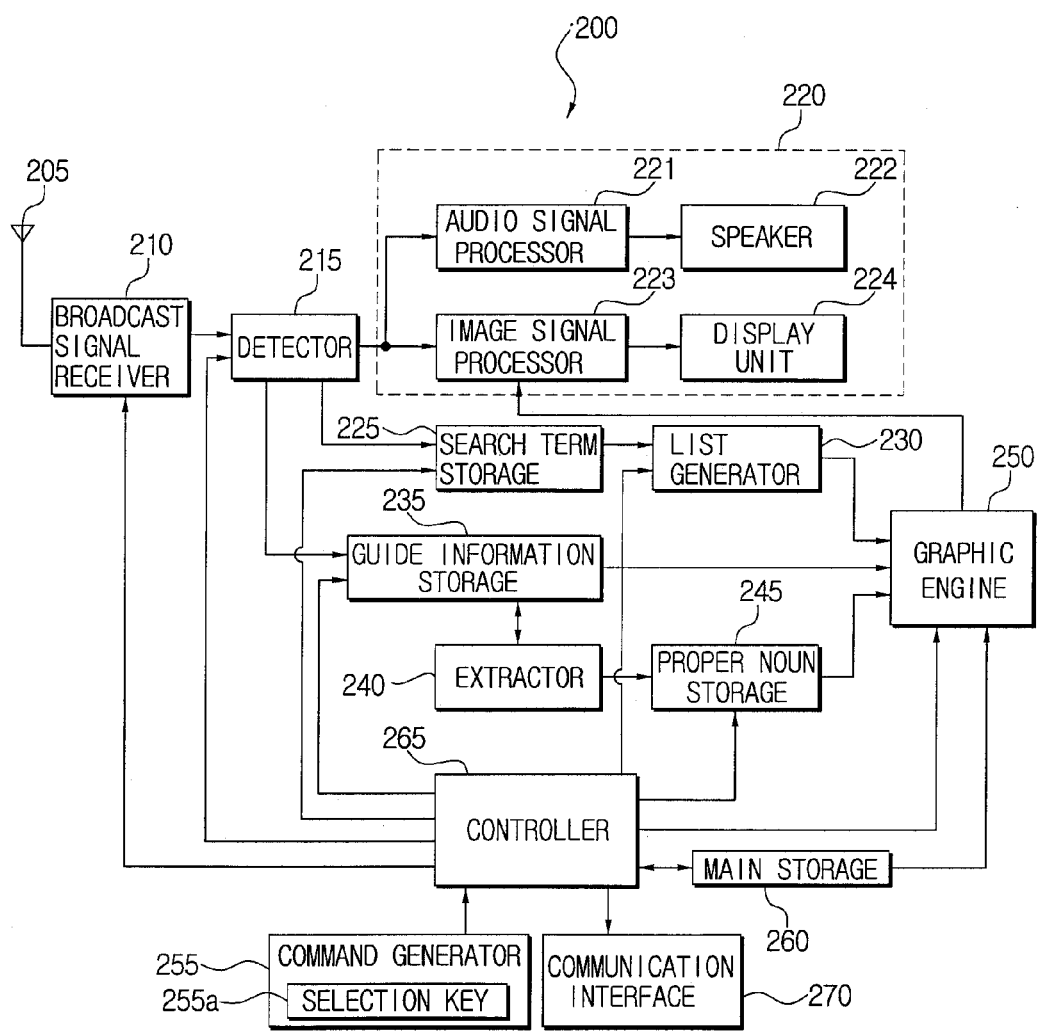
FIG. 3 is a block diagram for showing a digital signal receiver of FIG. 2 according to a first embodiment of the present invention.

FIG. 3 is a block diagram showing the digital signal receiver of FIG. 2 according to a first embodiment of the present invention.

Referring to FIG. 2 and FIG. 3, the digital signal receiver 200 has an antenna 205, a broadcast signal receiver 210, a detector 215, a broadcast signal processor 220, a search term storage 225, a list generator 230, a guide information storage 235, an extractor 240, a proper noun storage 245, a graphic engine 250, a command generator 255, a main storage 260, a controller 265, and a communication interface 270.

The broadcast signal receiver 210 selects a digital signal on a channel pre-set by a user from plural digital signals received through the antenna 205. The selected digital signal includes at least one search term with the order of priority in addition to a digital broadcast signal and EPG information related to the selected channel. At least one search term in the order of priority is data transmitted to the antenna 205 through the server 300 and the transmitter 100.

The detector 215 detects from the selected digital signal the EPG information and at least one search term, and outputs a signal, EPG information and at least one search term in the order of priority.

The EPG information is regulated to use and transmit a specific region of an image signal packet of a digital broadcast signal, so that the EPG information can be obtained by detecting and decoding information of the specific region. Further, at least one search term is carried in the specific region of the image signal packet for transmission in the same manner as the EPG information.

An audio signal of the outputted digital broadcast signal is inputted to an audio signal processor 221, an image signal to an image signal processor 223, the EPG information to a guide information storage 235, and at least one search term according to the order of priority to the search term storage 225. It is also possible that the audio and image signals of a broadcast signal are separated by the broadcast signal receiver 210 and inputted to the detector 215.

The broadcast signal processor 220 has the audio signal processor 221, a speaker 222, the image signal processor 223, and a display unit 224.

The audio signal processor 221 is similar to an audio signal processing circuit provided in existing digital signal receivers (not shown). In other words, the audio signal processor 221 decodes a received audio signal and then generates audio data in the analog form. The generated audio data is externally outputted through the speaker 222.

The image signal processor 223 decodes a received image signal and encodes the decoded image signal for example in the RGB manner, to thereby generate image data displayable. The generated image data is displayed through the display unit 224.

The display unit 224 displays image data generated from the image signal processor 223 and/or image data for each search mode generated by the graphic engine 250. The display unit 224 of the digital signal receiver 200 may be for example a Plasma Display Panel (PDP), a Liquid Crystal Display (LCD), a rear or front projection device, a CRT device or some other type of display capable of conveying visual information.

Further, the image signal processor 223 superimposes on an image signal to be currently displayed predetermined view information such as a search mode view transmitted from the graphic engine 250 to be later described, and transmits the superimposed view information to the display unit 224. At this time, the image signal processor 223 can superimpose the predetermined view information to take up the full screen of the display unit 224 or partially take up the screen.

The search term storage 225 stores at least one search term according to the order of priority and inputted from the detector 215. At least one search term according to the order of priority and stored in the search term storage 225 is high in search frequency, so that a user can easily search for the EPG information.

The list generator 230 arranges according to a set arrangement pattern at least one search term according to the order of priority and stored in the search term storage 225, and generates a search term list. A set arrangement pattern may be a descending order or an ascending order, for example, but it is preferable to arrange search terms in descending order. The generated search list is outputted to the graphic engine 250.

The guide information storage 235 stores the EPG information detected from the detector 215. The stored EPG information, if certain search terms are inputted and/or selected in plural search modes established, provides detailed information on broadcast programs related to the inputted and/or selected search terms by controls of the controller 265 to be later described.

Figure 1A:
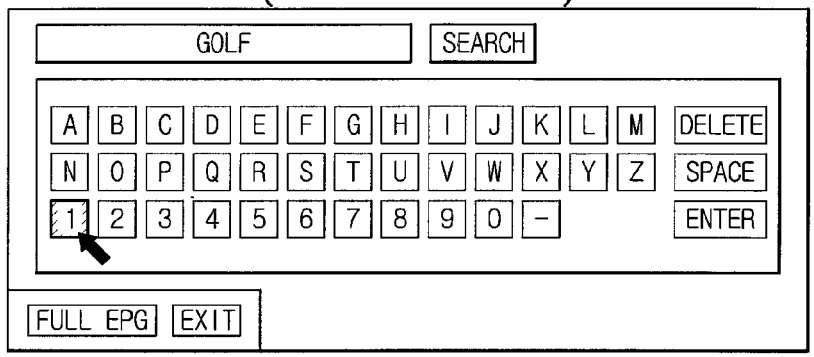
FIG. 1A to FIG. 1C are exemplary views shown to explain a conventional method for searching for information on broadcast programs.
Figure 1B:
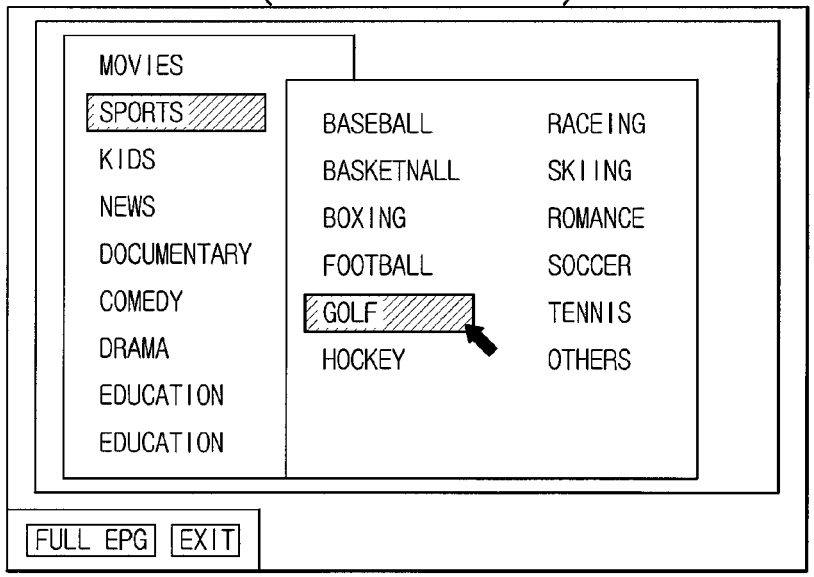

The plural search modes established are provided from a kind of application program, that is, software, which is developed in order for a user to search easily for the EPG information. Such search modes include an existing search mode based on text input as shown in FIG. 1A, a search mode based on category as shown in FIG. 1B, a search mode based on search terms high in search frequency as shown in FIG. 4A to be later described, a search mode based on proper noun as shown in FIG. 4B to be later described, and so on.

The extractor 240 detects search terms from EPG information stored in the guide information storage 235 according to a set reference. If a reference is set to detect proper nouns as search terms from the EPG information, the extractor 240 detects all the proper nouns as search terms from the EPG information. The proper nouns to be extracted can be program titles, heroes or heroines' names, and so on, for example.

The proper noun storage 245 stores search terms such as proper nouns extracted by the extractor 240. If a view display request signal is applied for a search mode based on the stored proper nouns, the proper noun storage 245 outputs the stored proper nouns to the graphic engine 250 by the controls of the controller 265.

The graphic engine 250 generates image data in order to implement on the display unit 224 a search term list generated from the list generator 230, the EPG information stored in the guide information storage 235, and plural proper nouns stored in the proper noun storage 245, and outputs the generated image data to the image signal processor 223.

By way of a more detailed description of the foregoing, if a view display request signal is applied in a search mode based on search terms high in the order of priority selected from several search modes, the graphic engine 250 inputs a search term list generated by the control of the controller 265 and generates image data displayable. The generated image data is implemented into a search mode view shown in FIG. 4A on the display unit 224.

Likewise, if a view display request signal is applied for a search mode based on proper nouns, a search mode based on text inputs, or a search mode based on categories, the graphic engine 250 inputs respective data and generates image data for the respective data, and the generated image data is implemented into search mode views shown in FIG. 4B, FIG. 1A, and FIG. 1B, respectively, on the display unit 224.

The command generator 255 is a user interface enabling a user to select a function the digital signal receiver 200 supports or to generate a function execution command to the controller 265. To do this, the command generator 255 is provided for example on a main body of the digital signal receiver 200 with function keys (not shown) including plural numerical keys, direction keys, Enter key, and so on.

In the present invention, the command generator 255 may have a selection key 255a or a button (not shown) for applying to the controller 265 a view display request signal for a predetermined search mode. Further, if a view display request signal for a certain search mode is transmitted from an external input device (not shown) such as a remote controller, it is preferable that a light-receiving device (not shown) receiving a user manipulation signal is provided on the main body.

The main storage 260 stores a control program for controlling and managing overall operations of the digital signal receiver 200.

The controller 265 controls the overall operations of the digital signal receiver 200 according to a signal applied from the command generator 255 based on a user's key input and/or selection and a control program stored in the main storage 260.

The operations of the controller 265 related to the present invention will be described in detail as follows. If a view display request signal for a certain search mode is applied to the controller 265, the controller 265 controls the graphic engine 250 and the image signal processor 223 to provide an initial search view as shown in FIG. 4A.

Further, if the initial search view as shown in FIG. 4A is provided, a user can select a certain search mode by using direction keys (not shown) provided by the command generator 255, and then input and/or select search terms. If certain search terms are inputted and/or selected, the controller 265 controls the guide information storage 235 to provide to the graphic engine 250 detailed broadcast information corresponding to the selected search terms.

Further, the graphic engine 250 generates image data for the provided detailed broadcast information, and transmits it to the image signal processor 223 under the control of the controller 265. Accordingly, a submenu for the selected search terms or detailed broadcast information is displayed on a view shown in FIG. 4C.

Further, the controller 265 controls the communication interface 270, which will be described below, to transmit the search terms selected in a certain search mode to the server 300.

The communication interface 270 in a preferred embodiment may include digital transfer means such as a universal serial bus (USB). The digital signal receiver 200 is connected to the server 300 by the communication interface 270, LAN lines 450, and ISP 400. Accordingly, the search terms inputted and/or selected in a certain search mode provided by the digital signal receiver 200 are transmitted to the server 300.

The search terms transmitted to the server 300 are stored in the first DB 310 according to search frequency by the control of the server controller 330, and periodically transmitted to the transmitter 100, so that the digital signal receiver 200 receives plural updated search terms high in search frequency.

Figure 5:
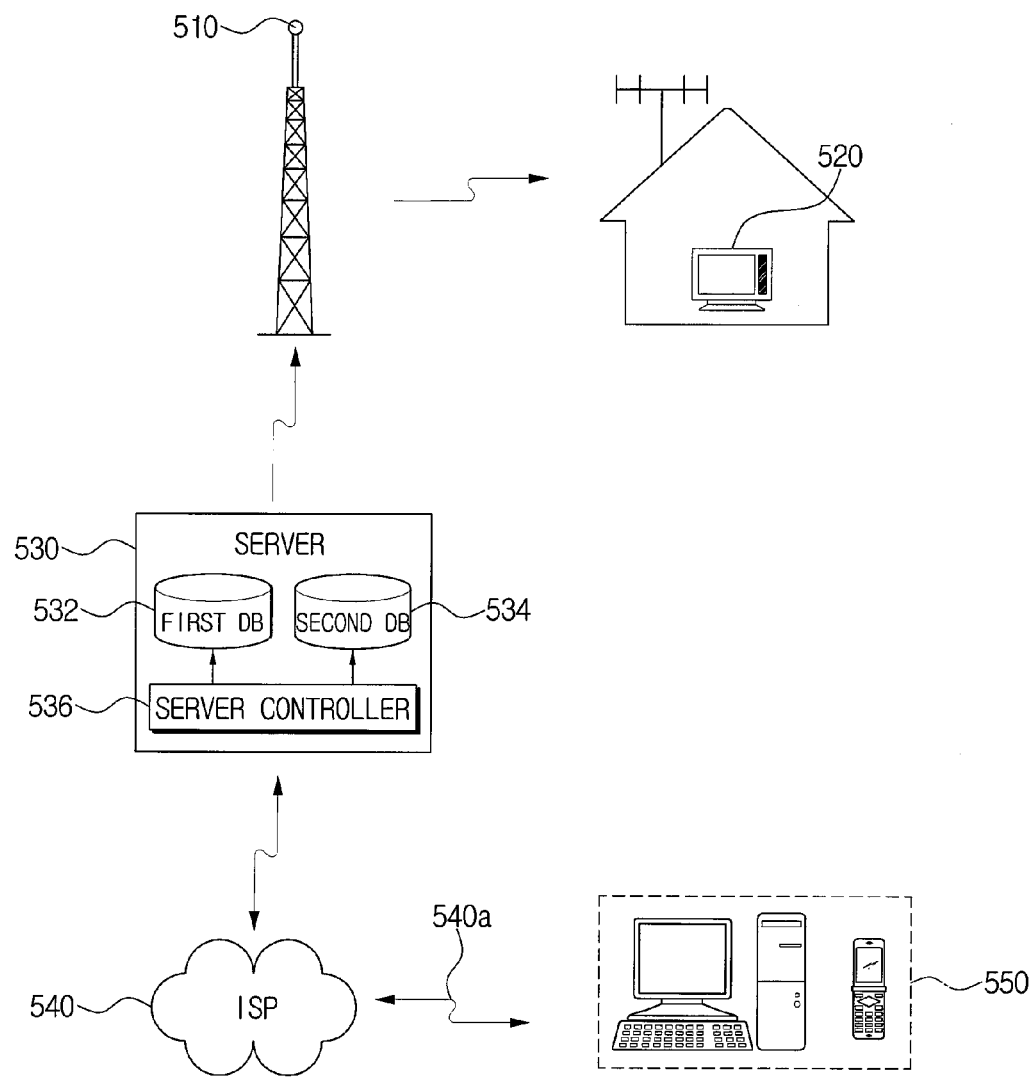
FIG. 5 is a view for schematically showing a broadcast program information search system according to a second preferred embodiment of the present invention.

FIG. 5 is a view for schematically showing a broadcast program information search system according to a second preferred embodiment of the present invention.

In FIG. 5, the digital signal receiver 520 receives a digital broadcast signal, EPG information, and at least one search term according to the order of priority from a transmitter 510.

The server 530 has first and second DB 532 and 534 storing at least one search term and EPG information, respectively, and a server controller 536. The server 530 is communicatably connected to an external network 550 through an ISP 540. The search terms may be stored in the first database according to the order of priority and/or may be stored in the first database according to some other order or scheme and extracted from the first database by the server according to the order of priority determined by the server. More specifically, the external network 550 and the server 530 may each be provided with a communication interface (not shown), and are communicatably connected by LAN lines 540a or in a wireless manner. The ISP 540 of FIG. 5 has substantially the same function for purposes of this discussion as the ISP 400 of FIG. 3, so detailed description of the ISP 540 will be omitted.

The external network 550 includes terminals such as computers shown in FIG. 5 or networks of computers, cellular phones, PCS, and so on, capable of inputting and outputting data. A user may input certain search terms in order to search for EPG information of predetermined broadcast programs by connecting to the internet through a computer, for example. The search terms inputted by the user are transmitted to the server 530 through the ISP 540 and stored in the first DB 532. The search terms are stored by priority based for example on search frequency by the control of the server controller 536.

Further, at least one search term of the plural transmitted search terms is periodically transmitted to the transmitter 510 according to the order of priority by the control of the server controller 536, and sent to the digital signal receiver 520 again.

The operations and functions of the digital signal receiver 520 are similar to those of the digital signal receiver 200 shown in FIG. 2 and FIG. 3. Accordingly, detailed description of the digital signal receiver 520 of FIG. 5 will be omitted. However, the digital signal receiver 520 of FIG. 5 is not connected to the ISP 540, so it is different from the digital signal receiver 200 shown in FIG. 2 and FIG. 3 in that the selected search terms are not transmitted to the server 530 even though certain search terms are inputted and/or selected in a certain search mode.

Figure 6:
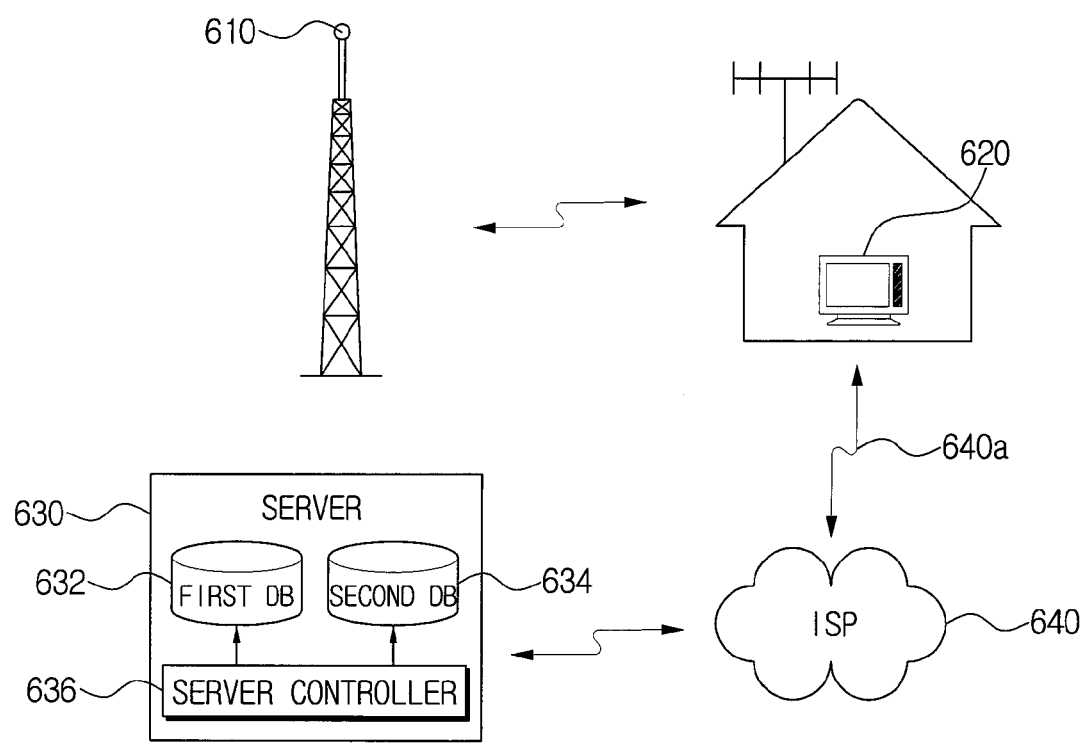
FIG. 6 is a view for schematically showing a broadcast program information search system according to a third preferred embodiment of the present invention.

FIG. 6 is a view for schematically showing a broadcast program information search system according to a third preferred embodiment of the present invention.

In FIG. 6, a digital signal receiver 620 receives a digital broadcast signal and EPG information from the transmitter 610, and receives at least one search term according to the order of priority from the server 630 through the ISP 640.

The operations and functions of the digital signal receiver 620 of FIG. 6 are nearly similar to the operations and functions of the digital signal receiver 200 of FIG. 2 and FIG. 3, so detailed description will be omitted. However, the digital signal receiver 620 of FIG. 6 is communicatably connected to a server 630 by LAN lines 640a and the ISP 640. Further, the digital signal receiver 620 of FIG. 6 is set to carry out a function of an internet-accessible web TV, which is a known technology so that detailed description will be omitted.

The digital signal receiver 620 of FIG. 6 provides a certain search mode as in the digital signal receiver 200 of FIG. 3, and search terms inputted through an input window in the provided search mode or the search terms selected in categories are transmitted to the server 630 by a communication interface (not shown) of the digital signal receiver 620.

Further, the server 630 and the ISP 640 shown in FIG. 6 carry out functions nearly similar to the server 300 and the ISP 400 shown in FIG. 2, so detailed descriptions will be omitted.

Search terms transmitted from the digital signal receiver 620 through the ISP 640 are stored in the first DB 632 of the server 630. The search terms stored in the first DB 632 are stored by order of priority based on search frequency by the control of the server controller 636. The search terms stored by such a order of priority are periodically transmitted to the digital signal receiver 620 through the ISP 640 and the LAN lines 640a by the control of the server controller 636.

In the third embodiment illustrated in FIG. 6, the digital signal receiver 620 can carry out the functions of a web TV, so that it can directly receive EPG information through the ISP 640 from the server 630 managing the EPG information rather than from the transmitter 610. The EPG information is stored in the second DB 634 of the server 630.

Figure 7:
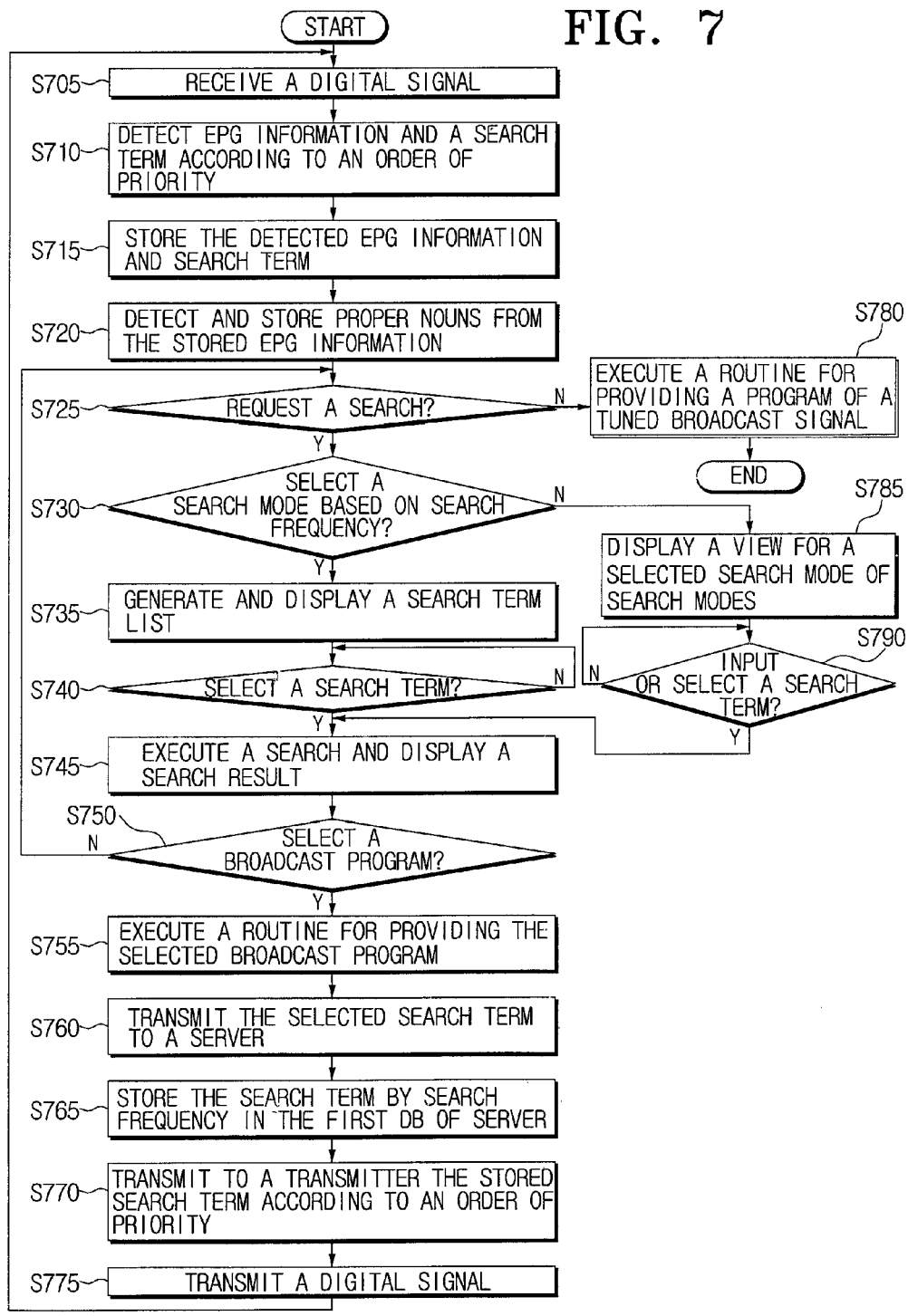
FIG. 7 is a flow chart for explaining an information search method for a broadcast program information search system shown in FIG. 2.

FIG. 7 is a flow chart for explaining an information search method for a broadcast program information search system shown in FIG. 2.

Steps S705 to S765 and S785 to S790 in FIG. 7 are executed in the digital signal receiver 200 by the control of the controller 265 provided in the digital signal receiver 200, steps S770 and S775 are executed in the server 300 communicatably connected to the digital signal receiver 200, and a step S780 is executed in the transmitter 100 transmitting a digital signal.

With reference to FIG. 2 and FIG. 3, the flow chart shown in FIG. 7 is described as follows.

A control unit 265 of the digital signal receiver 200 controls a broadcast signal receiver such as a tuner 210 to receive a digital signal on a pre-set channel from digital signals received through the antenna 205 (S705). The tuned digital signal includes a digital broadcast or content signal, EPG information, and at least one search term according to the order of priority. If the step S705 is executed, the controller 265 detects EPG information and at least one search term according to the order of priority from the tuned digital signal (S710). The method detecting the EPG information and search terms are the same as described for the detector 215 of FIG. 3.

The detected EPG information and at least one search term according to the order of priority are stored in the guide information storage 235 and the search term storage 225, respectively (S715).

Further, the controller 265 controls the extractor 240 to extract and store in the proper noun storage 245 only proper nouns from the EPG information stored in the guide information storage 235 (S720).

If the selection key 255a of the command generator 255 is selected and a search mode view display request signal is applied (S725), the controller 256 controls the graphic engine 250 to display a search mode view shown in FIG. 4A. The search mode view of FIG. 4A is a search view with default values given during a process manufacturing the digital signal receiver 200.

If a search mode based on search frequency is selected in the search mode view of FIG. 4A (S730), the controller 265 controls a list generator 230 to generate a search term list.

Further, the controller 265 controls the graphic engine 250 to produce image data for generating the search view shown in FIG. 4A. The generated image data is displayed on the display unit 224 to be superimposed on an original image in the image signal processor 223 or as it is (S735).

If a certain search term of "EPISODE 1" for example is selected from the search mode displayed in FIG. 4A (S740), the controller 265 searches for detailed broadcast information based on the search term, that is, "EPISODE 1", selected from the EPG information stored in the guide information storage 235.

The search method can be implemented to search for all the detailed information on broadcast programs including the selected search terms from the EPG information. The searched detailed broadcast information is transmitted to the graphic engine 250, generated into image data, and displayed in a search result view shown in FIG. 4C via the image signal processor 223 (S745).

Figure 4C:
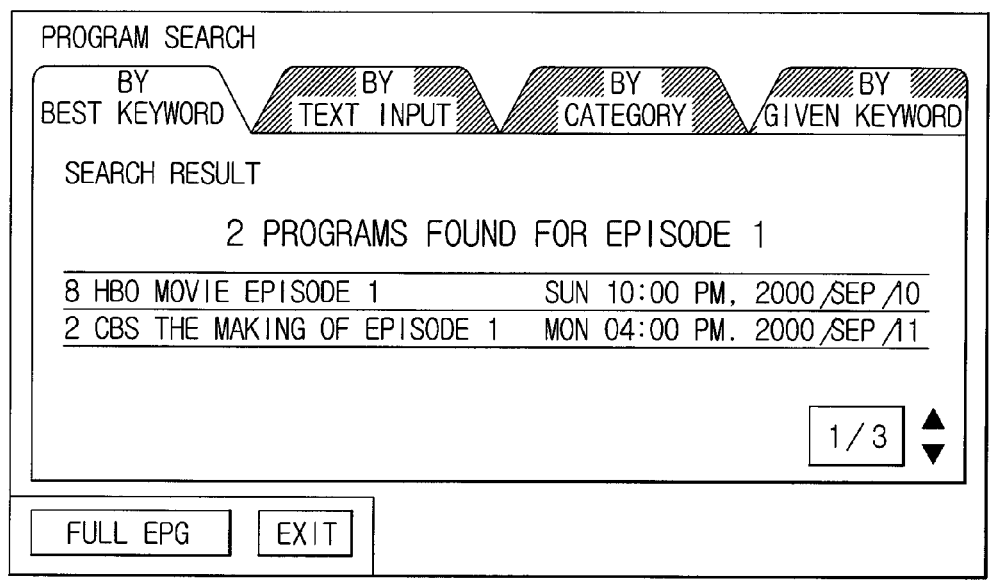
FIG. 4C is a view for showing a search result view for a search term selected in a certain search mode.

If a certain broadcast program a user wishes to watch is selected on the view of FIG. 4C (S750), the controller 223 runs a routine for providing the selected broadcast program (S755). However, if a certain broadcast program is not selected in the step S750, the controller 265 returns to the step S725.

Further, the controller 256 transmits the search term selected in the step S740 to the server 300 through the communication interface 270 (S760). The server controller 300 of the server 300 stores in the first DB 310 the selected search term transmitted through the LAN lines 450 and the ISP 400 from the digital signal receiver 200 (S765). It is preferable to store search terms by order of priority based on search frequency in the step S765.

Further, the server 300 is provided with the second DB 320 for storing EPG information. Accordingly, the server 300 periodically transmits to the transmitter 100 the EPG information and at least one search term according to the order of priority (S770).

The transmitter 100 transmits to the digital signal receiver 200 the EPG information and at least one search term according to the order of priority, which are transmitted from the server 300, in addition to a digital broadcast signal (S775).

In the meantime, if the step S720 is carried out and a view display request signal for a search mode is not applied from the command generator 255 (S725), the controller 265 launches a routine to display broadcast programs that a tuned broadcast signal provides when the digital signal receiver 200 is powered on (S780).

Further, if the step S725 is executed and any of search modes other than the search mode based on search frequency is selected on the search mode view of FIG. 4A (S730), the controller 265 controls the graphic engine 250 to display a view for a selected search mode (S785).

The search modes other than the search mode based on search frequency as shown in FIG. 4A include the search mode by text input as shown in FIG. 1A, the search mode based on categories as shown in FIG. 1B, the search mode based on proper nouns as shown in FIG. 4B, and so on, as aforementioned.

Figure 1C:
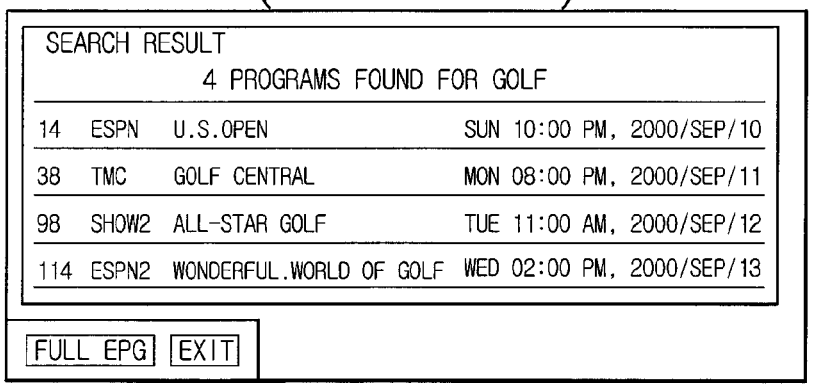

If the step S785 is executed, a certain search mode is selected, and certain search terms are typed in or selected by a user from the command generator 255 (S790), the controller carries out the step S745. For example, if the search mode based on text input is selected in the step S785, a user types in a search term of "Golf" as shown in FIG. 1A by using the command generator 255. Accordingly, the controller 265 controls the guide information storage 235, graphic engine 250, and the image signal processor 223 to display the search result view as shown in FIG. 1C.

At step S765, the server 300 may receive and process search terms which are searched in the terminal 500 capable of inputting and outputting data in addition to the digital signal receiver 200. That is, search terms received from the terminal 500 are stored in the first DB 310 and added to previously stored search terms having a certain search frequency.

The broadcast program information search system and method according to the present invention can store in separate databases search terms selected by a user to search for EPG information as well as store a search frequency as to selected search terms. The search terms stored by search frequency are transmitted to a digital signal receiver and displayed on a search view convenient to the user, and the user can more easily search for EPG information by confirming favorite search terms which are frequently typed in. Further, favorite search terms stored in separate databases are updated based on search frequency, and the favorite search terms are periodically transmitted to the digital signal receiver so that the user can search for EPG information through the updated search view.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A display apparatus, comprising:
 a display unit; and
 a controller configured to
 control the display unit to display a screen comprising a user interface for selecting one among a plurality of search modes,
 extract nouns for keyword search from program guide information,
 in response to a search mode based on keyword among the plurality of search modes being selected via the user interface, control the display unit to display the extracted nouns as search terms to be used to search the program guide information, and
 in response to one of the extracted nouns being selected, perform search with the selected noun as a search term and display a search result.

2. The display apparatus as claimed in claim 1, further comprising:
 a communicator configured to communicate with an external server,
 wherein the controller is configured to receive the program guide information and a keyword from the external server through the communicator.

3. The display apparatus as claimed in claim 1, wherein in response to the search mode based on search frequency being executed, the controller is configured to control the display unit to display a keyword list including keywords based on frequency of use.

4. The display apparatus as claimed in claim 3, wherein the keywords included in the keyword list are arranged and displayed based on the frequency of use of each of the keywords that are used for search.

5. The display apparatus as claimed in claim 3, wherein the controller is configured to search for, in the program guide information, broadcast information including a keyword selected from the displayed keyword list in the search mode based on search frequency.

6. The display apparatus as claimed in claim 5, wherein the controller is configured to control the display unit to display the searched broadcast information.

7. The display apparatus as claimed in claim 1, wherein the controller is configured to search for, in the program guide information, broadcast information including a proper noun selected from proper nouns that are displayed in the search mode based on proper nouns.

8. The display apparatus as claimed in claim 7, wherein the controller is configured to control the display unit to display the searched broadcast information.

9. The display apparatus as claimed in claim 1, wherein the plurality of search modes comprises at least three of a search mode based on keyword being executed, a search mode based on search frequency being executed, a search mode by text input, and a search mode by category selection.

\* \* \* \* \*